United States Patent
Bordesoules et al.

(10) Patent No.: US 7,938,309 B2
(45) Date of Patent: May 10, 2011

(54) PULSED FRICTION STIR WELDING PROCESS

(75) Inventors: Isabelle Bordesoules, Saint Egreve (FR); Christian Hantrais, Chirens (FR); Jean-Pierre Armenio, Moirans (FR)

(73) Assignee: Alcan Rhenalu, Courbevoie (FR)

( * ) Notice: Subject to any disclaimer, the term of this patent is extended or adjusted under 35 U.S.C. 154(b) by 0 days.

(21) Appl. No.: 12/491,442

(22) Filed: Jun. 25, 2009

(65) Prior Publication Data

US 2009/0324991 A1    Dec. 31, 2009

Related U.S. Application Data

(60) Provisional application No. 61/086,840, filed on Aug. 7, 2008.

(30) Foreign Application Priority Data

Jun. 30, 2008  (FR) ...................... 08 03662

(51) Int. Cl.
*B23K 20/12* (2006.01)
(52) U.S. Cl. ..................... 228/112.1; 228/2.1

(58) Field of Classification Search ............... 228/112.1, 228/2.1
See application file for complete search history.

(56) References Cited

U.S. PATENT DOCUMENTS

| | | | |
|---|---|---|---|
| 6,450,394 B1 * | 9/2002 | Wollaston et al. | 228/112.1 |
| 2004/0046003 A1 * | 3/2004 | Vyas | 228/112.1 |
| 2005/0040209 A1 * | 2/2005 | Stotler et al. | 228/102 |

* cited by examiner

*Primary Examiner* — Jessica L Ward
*Assistant Examiner* — Nicholas P D'Aniello
(74) *Attorney, Agent, or Firm* — Dennison, Schultz & MacDonald

(57) ABSTRACT

A process for friction stir welding at least a first part made of metal alloy A with at least a second part made of a dissimilar metal alloy B, in which the first and second parts are placed side by side, and a joint is made between the first and second parts using a rotating tool moving at a speed referred to as the travel speed. The tool travel speed has at least two alternated modes in continuous service, a first mode wherein a first average travel speed S1 and a second mode wherein a second average travel speed S2 is used, the speeds S1 and S2 being significantly different, typically at least 30% of the highest travel speeds, with the slowest advance speed being zero. The assemblies welded according to the invention are particularly advantageous for the fabrication of panels or structural sections used in the manufacture of transport vehicles.

19 Claims, 8 Drawing Sheets

PULSED FRICTION STIR WELDING PROCESS

This application claims the benefit of U.S. Provisional Application Ser. No. 61/086,840 filed Aug. 7, 2008.

FIELD OF THE INVENTION

The invention concerns the welding of metal parts according to the fiction stir welding process. More precisely, it concerns the welding together of two parts having very different mechanical characteristics.

DESCRIPTION OF RELATED ART

It is generally known that, during the fabrication of semi-finished products and structural elements for the aeronautic construction sector, certain required properties cannot generally be optimized simultaneously, independently of each other. This is sometimes the case of properties expressed by the term "static mechanical strength" (notably tensile strength Rm and the yield strength Rp0.2), and the properties expressed by the term "damage tolerance" (notably strength and resistance to crack propagation). For each use considered for a structural element, an appropriate compromise must be sought between the static mechanical properties and the damage tolerance properties. This notion is designated herein by "property compromise". Additional properties, such as corrosion resistance, may be included in the property compromise as required, and in certain cases it may even be necessary to define a compromise between two or more properties in a group of properties designated by "static mechanical strength" or "damage tolerance", such as yield strength and elongation which tend to be incompatible. The need to optimize the property compromise is of particular importance for certain parts or structural elements for which the best results may be obtained if the static mechanical strength was optimized on a geometric end and the damage tolerance was optimized on the other geometric end. The welding of parts exhibiting optimal characteristics for each part of the structural element allows structural elements with optimized properties to be obtained.

Patent application EP1799391 (Alcan Rhenalu) details a manufacturing process of a structural element consisting of at least two parts made of an aluminum alloy having various property compromises, said two parts being welded and wherein one of said parts is (i) made of an aluminum alloy different from the other said two parts and/or (ii) having an initial metallurgical state different from the other said two parts, and wherein at least one of said two parts was pre-tempered before being welded, and wherein the structural element has undergone post-weld tempering giving each of said two parts a final metallurgical state.

The TWI (The Welding Institute) initiated friction stir welding in the United Kingdom in the 1990s. It was rapidly developed in the field of aluminum alloy assembly. The principle was obtaining a weld without fusion by means of a strong shearing force applied to the metal via a rotary tool which mixes the two materials to be assembled. A reduced yield stress is obtained first of all by heating the metal by means of friction of a shoulder on the metal surface before moving the tool which gradually welds the parts. The shoulder also allows the metal to be contained and maintain pressure thus preventing the metal from being ejected outside the zone welded.

The process makes it possible to avoid the problems of hot cracking, which in particular makes it possible to weld alloys considered as being unweldable by fusion, for example, 2XXX alloys with magnesium or 7XXX alloys with copper, which are the alloys typically used in the aeronautical construction industry.

The parameters of the friction stir welding process are primarily: the selection of the tool geometry, the rotation speed and the tool travel speed (also referred to as the welding speed) and the force applied to the tool. These parameters are not independent. Generally speaking, the rotation speed must be increased as the welding speed increases, for example. Furthermore, the optimum welding speed is generally inversely proportional to the welding thickness (see for example "Le soudage par friction-malaxage", R. CAZES, Les Techniques de l'Ingeniéur, BM 7 746 1-9).

Patent application DE 199 53 260 A1 describes in a systematic way the possibilities of cyclic variation of welding speed, rotation speed, applied force, tool height without providing details on which variation to select and under which conditions it is advantageous.

Patent application US 2004-046003 describes cyclic variation of the rotation speed of the tool in order improve mixing of plastified metal.

U.S. Pat. No. 6,450,394 describes a method of forming structural airframe components by using friction stir welding. This patent mentions the possibility to vary the welding speed and the rotational speed in order to adapt welding conditions to varying product thicknesses.

The welding parameters must be adapted to the alloy being welded, and particularly to its hot hardness or its hot yield stress. For each alloy in a given metallurgical state, for a given welding thickness, optimal welding conditions can be obtained in terms of tool rotation speed and travel speed. The optimal travel speed is generally the highest speed enabling satisfactory weld quality to be obtained, particularly free of porosities and surface defects. When two metal materials with different mechanical characteristics are welded, and particularly in terms of hot yield stresses, intermediate welding parameters between those most adapted for either of the alloys are generally used. However, it becomes difficult, or even impossible, to find satisfactory intermediate conditions in certain cases, particularly when the hot yield stresses of the materials to be welded are very different.

A process needs to be developed that is able solve the problem involving the use of friction stir welding to weld two or more parts having dissimilar metal alloys, and particularly with very different hot yields stresses.

SUMMARY OF THE INVENTION

The object of the invention concerns a friction stir welding process involving at least a first part made of metal alloy A and at least a second part made of a dissimilar metal alloy B wherein:

said first and second parts are placed side by side, and a joint is made between said first and second parts using a rotating tool moving at a speed referred to as the travel speed, characterized in that said tool travel speed has at least two alternated modes in continuous service, a first mode wherein a first average travel speed V1 and a second mode wherein a second average travel speed V2 is used, the speeds V1 and V2 being significantly different, typically by at least 20% and preferably by at least 30% of the fastest travel speed, with the slowest travel speed being zero.

A second object of the invention is an assembly between a first part and a second part made of metal alloys, obtainable by the friction stir welding process of the invention, characterized in that the welding energy of said first and second parts differs by a factor at least equal to 1.5 in the metallurgical state used during the welding operation and for the thickness welded.

Another object of the invention is a structural element used in aeronautical construction comprising an assembly according to the invention.

DESCRIPTION OF THE PREFERRED EMBODIMENTS

The alloys are designated in compliance with the rules of The Aluminum Association (AA), known to the person skilled in the art. The definitions of metallurgical states are indicated in European standard EN 515.

Unless otherwise stipulated, the static mechanical characteristics, in other words the tensile strength Rm, the 0.2% offset yield strength Rp0.2 and breaking elongation A, are determined by a tensile test in accordance with standard EN 10002-1, the sampling and the direction of the test being defined by standard EN 485-1.

Figure 1:
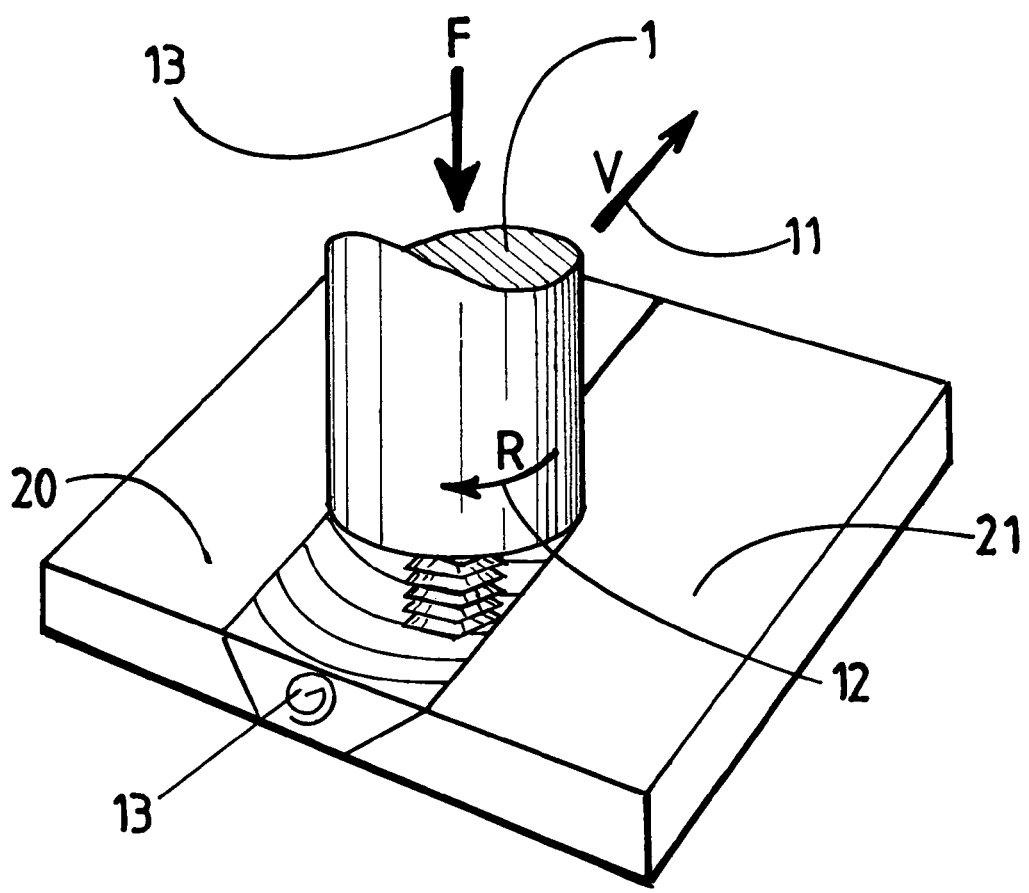
FIG. 1 is a general diagram describing the friction stir welding process.

FIG. 1 describes a friction stir welding operation. Two parts (20) and (21) are placed side by side. A tool (1), under a force F applied in the vertical direction (13), moves with a travel speed in the horizontal direction while rotating in direction (12) with a rotation speed R. The advancing side is the side where the local direction of the tool's surface, due to the rotation of the tool, and the welding direction (11) are identical; the part (20) is located on the advancing side. The retreating side is the side where the local direction of the tool's surface due to the rotation of the tool, and the welding direction (11) are opposite; part (21) is located on the retreating side. The tool's rotation speed R is the speed at which the tool rotates in the direction of rotation (12). The travel speed is the speed at which the tool moves along the welding direction (11). Within the scope of the invention, the average travel speed is the average of the instantaneous travel speeds over a given duration of time.

The friction stir welding operation typically includes three phases, an engagement phase during which the tool is placed in contact with the parts to be welded, the continuous stirring phase during which the tool progresses in a regular manner on the parts to be welded and a retraction phase during which the tool is removed from the parts to be welded. Specific regimes in terms of rotation speed and travel speed can be used, in certain cases, during the engagement and retraction phases. This invention concerns the continuous regime, i.e. the process parameters used during the stirring phase.

For a given metal alloy, in a given metallurgical state and for a given weld thickness, optimal welding parameters exist which make it possible to obtain a weld whose visual quality on both the surface and cross-section is satisfactory and whose mechanical strength is maximal while using the fastest welding speed possible. The optimal parameters are essentially defined by the travel speed, rotation speed and the force applied. It can be estimated that the determination of these optimal parameters is accurate to within more or less 10%. The measured torque required for tool rotation in these optimal conditions is an indication of the rheological characteristics of the alloy in question. Measured torque here refers to the torque measured during the welding operation less the torque measured during the rotation of the tool with no load. Based on the optimal parameters and the measured torque, a welding energy is defined for a given alloy in a given metallurgical state and given weld thickness.

Welding energy (J/m)=measured torque×rotation speed×2π/travel speed

The measured torque is expressed in N.m., the rotation speed in rpm and the travel speed in m/minute.

Table 1 of example 1 gives the optimal parameters for the AA2050-T3 alloy and AA7449-T6 alloy for a welded thickness of 20 mm. The welding energy of the AA7449-T6 alloy is nearly three times greater than that of the AA2050 alloy in the T3 temper for this welded thickness.

This invention allows parts made of dissimilar metal alloys to be welded. The term "dissimilar metal alloys" particularly refers to metal alloys for which the welding energy is significantly different, by a factor of 1.5 or 2 or 2.5. This may concern, for example, two aluminum alloys whose hot yield stress is very different, or an aluminum alloy and a titanium alloy, or even steel and a copper alloy and a titanium alloy and aluminum.

Among aluminum alloys having a high welding energy, the invention is advantageous in particular for the alloys of the 5XXX and 7XXX families. Table 7 provides other welding energies measured or estimated for plates made of alloys AA7449, AA2022 and AA7040. Results from Table 7 show that the welding energy of joined plates as described in EP1799391 did not exhibit a significantly different welding energy.

The invention is particularly advantageous for a friction stir welding process for 7XXX alloy parts with yield strength greater than 500 MPa, and preferably greater than 530 MPa, in the final metallurgical state with another dissimilar metal alloy. Final metallurgical state refers to the metallurgical state of the part after the welded assembly has undergone possible tempering.

Among the alloys having a lower welding energy, the invention is particularly advantageous for the alloys of the 2XXX, 6XXX and 8XXX families. The invention is particularly advantageous for friction stir welding of parts made of aluminum-lithium type aluminum alloy, i.e. containing at least 0.8% lithium by weight, with a part made of a dissimilar metal alloy, in particular a part made of a 7XXX alloy having a yield strength greater than 500 MPa in the final metallurgical state.

Within the scope of this invention, alloy parts selected from the AA2X39, AA2X24, AA2X98, AA2X95, AA2X96 AA2X50, AA6X56, and AA6X82 group can be welded using the friction stir welding process with parts taken from the group consisting of AA7X49, AA7X55, AA7X50, AA7X75, AA7X85, and AA5X82. AA7X49 refers to AA7049, AA7149, AA7249, AA7349, and AA7449 alloys, mutatis mutandis for the other alloys cited. A preferred titanium alloy is the Ti-6A1-4V alloy.

According to the invention, parts made of dissimilar metal alloys are welded by friction stir welding using a process wherein:

the parts are placed side by side;
a joint is made between the parts using a rotating tool moving at a speed referred to as the travel speed; and
the tool travel speed has at least two alternated modes in continuous service, a first mode wherein a first average travel speed V1 and a second mode wherein a second average travel speed V2 is used, the speeds V1 and V2 being significantly different, typically by at least 20% and preferably by at least 30% of the fastest travel speed, with the slowest travel speed being zero.

The parts can be placed side by side in any geometry enabling a weld joint to be made by friction stir welding, the precision of the positioning not being critical. The welding operation is essentially performed on parts placed edge to edge (butt welding) accept for other joint configurations such as fillet welding, T-welding or lap welding.

Surprisingly, the inventors noted that the alternation of a hot period (for which the travel speed is low or even zero) and a cold period (for which the travel speed is high), provides a solution to the significant difference in the yield stress of the alloys being welded. Speeds V1 and V2 must be significantly different, typically at least 20% and preferably at least 30% in order to obtain the desired effect. According to an advantageous embodiment of the invention, the difference between V1 and V2 is at least equal to 30 mm/min.

Preferably, the first and second modes are alternated with a cycle whose duration T is less than 15 seconds, preferably between 0.1 and 10 seconds and most preferably between 0.5 and 7 seconds. The number of cycles performed per millimeter of weld depends on the welding speed used, which depends in particular on the composition of the metal alloys and the thickness of the parts; it is typically 15 cycles for 50 mm of weld.

Preferably, the first mode is maintained for duration T1 and the second mode is maintained for duration T2, T1 and T2 being at least equal to 20% of the duration T. The durations T1 and T2 represent a sufficient proportion of the duration of the cycle so that the effect on weld quality is observed. According to an advantageous embodiment of the invention, the durations T1 and T2 are essentially equal, i.e. that they differ no more than 20%. Preferably, the parameters T1, T2, expressed in seconds and V1, V2, expressed in mm/s obey the relationship: $1<(T1V1-T2V2)^2<400$.

Typically, the travel distance during the cold period (high travel speed) is in the order of 3 mm while the travel distance during the hot period (slow travel speed) is less than 1 mm.

The parameters to be used for the welding operation may be found based on the optimal parameters determined for each part taken separately. An important parameter is the average welding travel speed in continuous service, i.e. the average travel speed throughout the entire duration of continuous service. For example, when only two modes are used having an average travel speed V1 and V2 for durations T1 and T2, $V=(T1 \times V1+T2 \times V2)/(T1+T2)$. Advantageously, a speed within the range defined by the part's optimal travel speed requiring the highest welding energy plus or minus 20% is used as the average travel speed V in continuous service.

The hot and cold periods can be amplified by combining a variation of the rotation speed with the variation of the travel speed. However, it is advantageous to use a tool rotation speed that is essentially constant during continuous service. Furthermore, variations in tool rotation speed are detrimental to the motor of the friction stir welding machine and these variations may significantly limit the device's service life. The inventors also believe that weld quality and its reproducibility are better when the tool's rotation speed is essentially constant in continuous service.

Preferably, the rotation speed of the tool is within a range defined by the tool's optimal rotation speed for the part requiring the highest welding energy, plus or minus 20%. The inventors noted that when the rotation speed is greater than the tool's optimal rotation speed of the part requiring the highest welding energy plus 20%, the temperature reached during the hot period may become too high and a flash risk is possible and, furthermore, the measured torque may be unstable which may result in irregular weld quality.

The relative position of the elements to be welded may, for certain pairs of alloys, have an effect on the quality of the weld. In an advantageous embodiment of the invention, the part requiring the highest welding energy is placed on the retreating side.

The invention can be used to weld parts of all thicknesses. However, the invention is particularly advantageous when the welding thickness is between 1 and 40 mm, preferably between 10 and 30 mm and most preferred between 12 and 20 mm. The welding speeds are adapted to the thickness welded. In an advantageous embodiment in which the first and second parts are made of aluminum alloy, the difference between V1 and V2 expressed in mm/min. is at least equal to 600/t, where t is the welding thickness expressed in mm.

The invention makes it possible to obtain assemblies welded using a friction stir welding process that would not have been possible by the procedure of prior art, as the weld quality and the mechanical properties would have been insufficient. In this manner, the invention makes it possible to obtain a welded assembly performed by friction stir welding between a first part and a second part made of metal alloys characterized in that the welding energy of the first and second parts differs by a factor at least equal to 1.5 in the metallurgical state used during the welding operation and for the thickness welded.

The assembly welded according to the invention advantageously presents an elongation of at least 1.5%, and preferably at least 2.5% for an extensometer length L0=80 mm and/or a tensile strength Rm equal to at least 46% and preferably at least 48% of the tensile strength of the part having the highest tensile strength.

The assemblies welded according to the invention are particularly advantageous in the fabrication of panels or structural sections used in the manufacture of transport vehicles. In particular, the assemblies according to the invention are useful in the fabrication of railway cars, public transport vehicles, maritime transport, automobiles and aircraft. The assemblies welded according to the invention find particularly advantageous applications in aeronautic construction regarding the fabrication of structural elements. The term "structural element" refers to an element used in mechanical construction for which the static and/or dynamic mechanical characteristics have special importance for the performance and integrity of the structure, and for which a structural calculation is generally prescribed or given. It is typically a metal part, the failure of which is likely to endanger the safety of said construction, and its users, or third parties. For an aircraft, these structural elements notably include the elements which make up the fuselage (such as the fuselage skin, fuselage stiffeners or stringers, bulkheads, circumferential frames, wing skin, stringers or stiffeners, ribs and spars and horizontal or vertical stabilizers, as well as floor beams, seat tracks and doors.

EXAMPLES

Example 1

Figure 2:
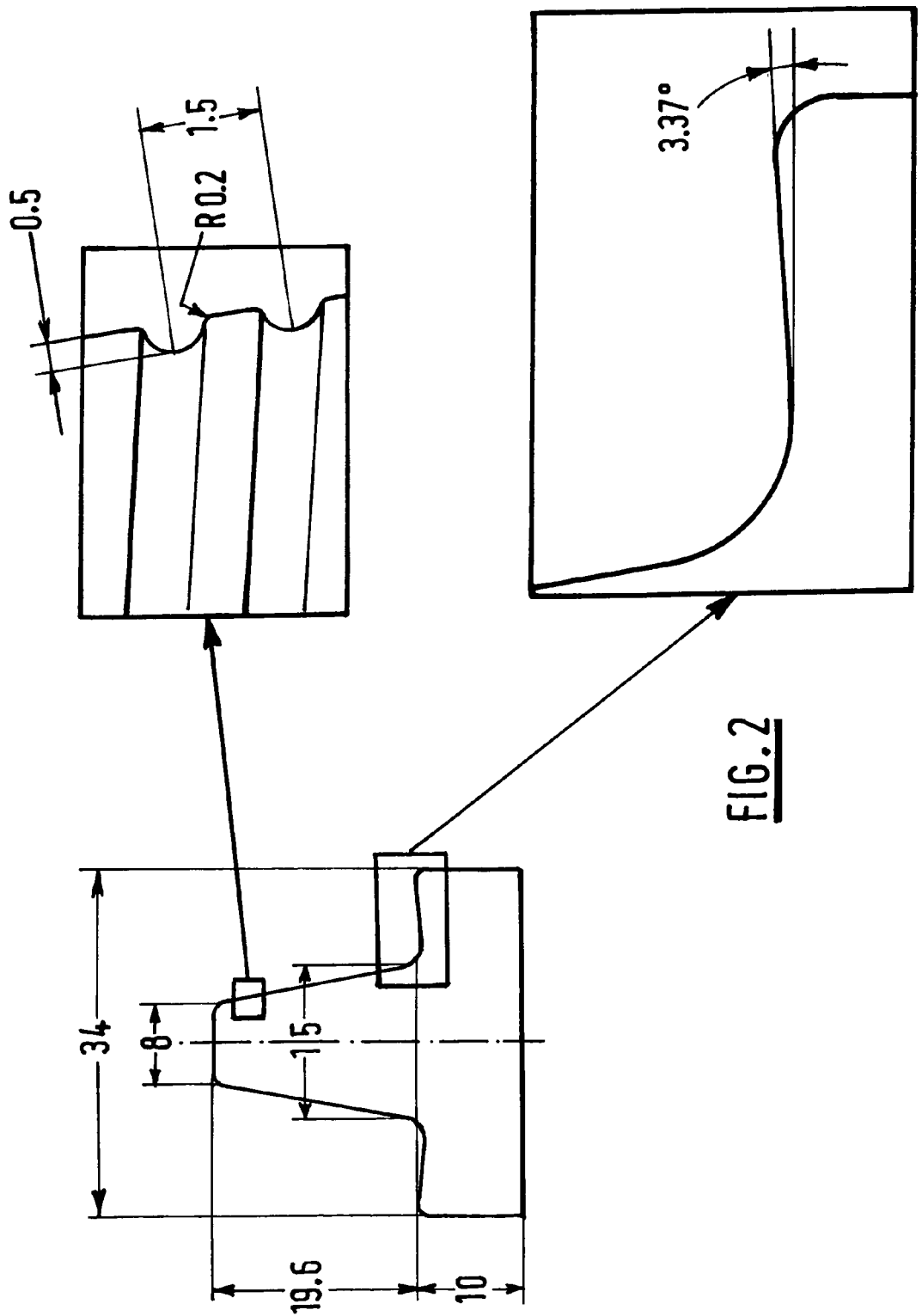
FIG. 2 is a diagram of the tool used during the tests, with dimensions indicated in mm.

In this example, a weld was performed by friction stir welding. The optimal weld speed, optimal rotation speed and the welding energy were determined for 40 mm-thick AA2050-T351 alloy and AA7449-T6 alloy, for a weld thickness of 20 mm, using a conical tool with 3 flats at 120° and 0.5 mm deep, the cross-sectional geometric characteristics of which are provided in FIG. 2 (dimensions indicated in mm), on an MTS Istir® machine. Machining of 0.2 mm was performed on each side of the sheets to remove surface oxides. The optimal conditions correspond to the highest welding speed that can be reached while obtaining satisfactory weld quality in terms of both cross-section (particularly without porosities, see FIG. 4) and on the surface (particularly without flashes, see FIG. 3).

The results obtained are given in Table 1.

TABLE 1

| | optimal friction stir welding conditions | | | | | | |
|---|---|---|---|---|---|---|---|
| Alloy | Sheet thk (mm) | Thk welded (mm) | Torque (N·m) | Force applied F (kN) | Rotation speed (rpm) | Travel speed (mm/min) | Welding energy (J/m) |
| 2050-T351 | 40 | 20 | 250 | 66 | 230 | 190 | $1.9 \cdot 10^6$ |
| 7449-T6 | 40 | 20 | 170 | 55 | 250 | 55 | $4.85 \cdot 10^6$ |

Example 2

In this example, an attempt was made to perform friction stir welding on sheets made of AA2050-T351 alloy with sheets made of AA7449-T6 alloy with the same machine and same tool as in Example No. 1. The sheets were secured to the welding table using 3 clamps on each side. The welding speed and tool rotation speed were maintained constant in continuous service. The parameters used for the various tests and the results obtained are given in Table 2.

TABLE 2

| | Friction stir welding tests at constant travel speed | | | | | | |
|---|---|---|---|---|---|---|---|
| Test No. | Advancing side | Retreating side | Tool rotation speed (rpm) | Travel speed (mm/min) | Force applied | Surface condition | Joint compactness |
| 1 | 2050 | 7449 | 350 | 50 | 55 | Faulty | Good |
| 2 | 2050 | 7449 | 250 | 50 | 55 | Faulty | Good |
| 3 | 2050 | 7449 | 350 | 100 | 55 | Faulty | Good |
| 4 | 2050 | 7449 | 200 | 50 | 55 | Faulty | Good |
| 30 | 2050 | 7449 | 250 | 100 | 55 | Faulty | Good |
| 8 | 7449 | 2050 | 250 | 50 | 50 | Good | Faulty |
| 10 | 7449 | 2050 | 250 | 70 | 55 | Good | Faulty |
| 19 | 7449 | 2050 | 300 | 70 | 55 | Stop - machine limit | |
| 25 | 7449 | 2050 | 250 | 70 | 60 | Good | Faulty |
| 26 | 7449 | 2050 | 250 | 70 | 57 | Good | Faulty |

Figure 3:
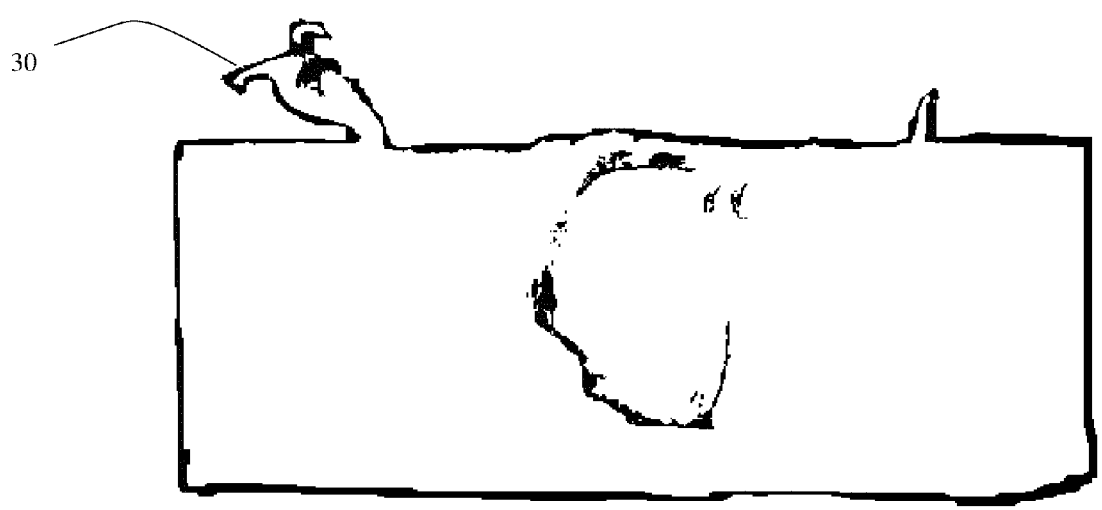
FIG. 3 is a cross-section of the weld performed in test No. 1.
Figure 4:
FIG. 4 is a cross-section of the weld performed in test No. 2.

FIG. 3 is a cross-section of the weld obtained for test 1. The compactness of the joint is good although numerous "flash" faults (30) are observed on the surface. FIG. 4 is a cross-section of the weld obtained for test 2. The surface quality is satisfactory (no flash) although the joint's compactness is faulty: numerous porosities are observed in the zone (31).

Example 3

In this example, an attempt was made to perform friction stir welding according to the invention on sheets made of AA2050-T351 alloy with sheets made of AA7449-T6 alloy using the same machine and same tool as in Examples No. 1 and 2.

Figure 6:
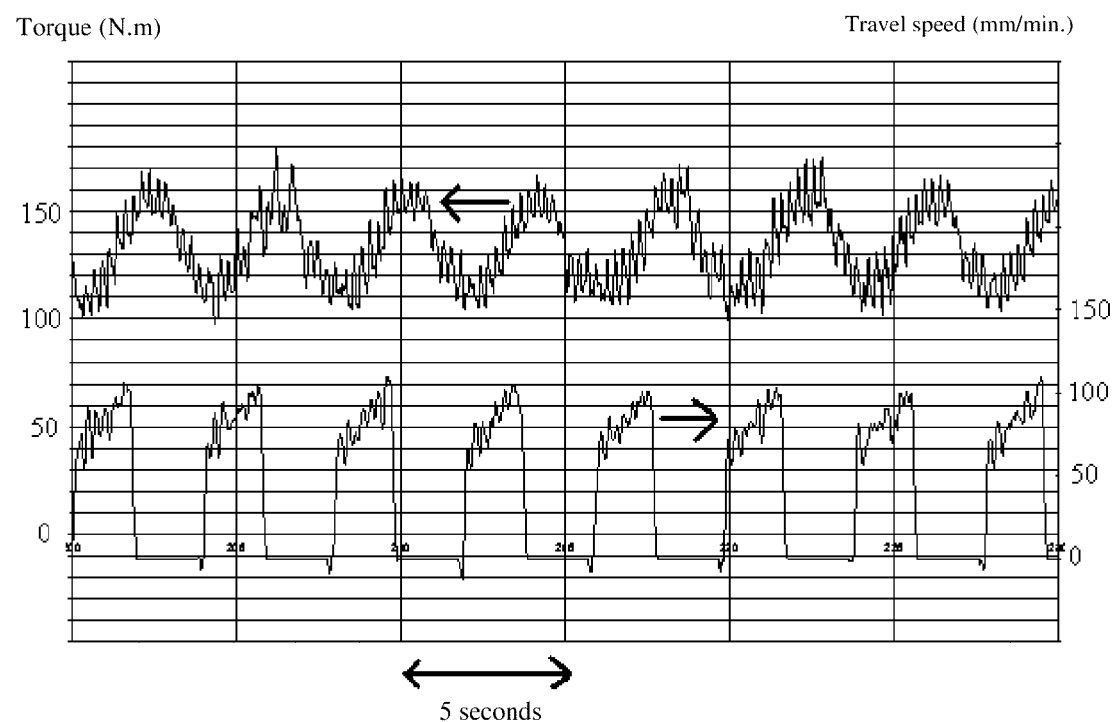
FIG. 6 is an extract of the torque measurement and travel speed recording for test No. 41.
Figure 7:
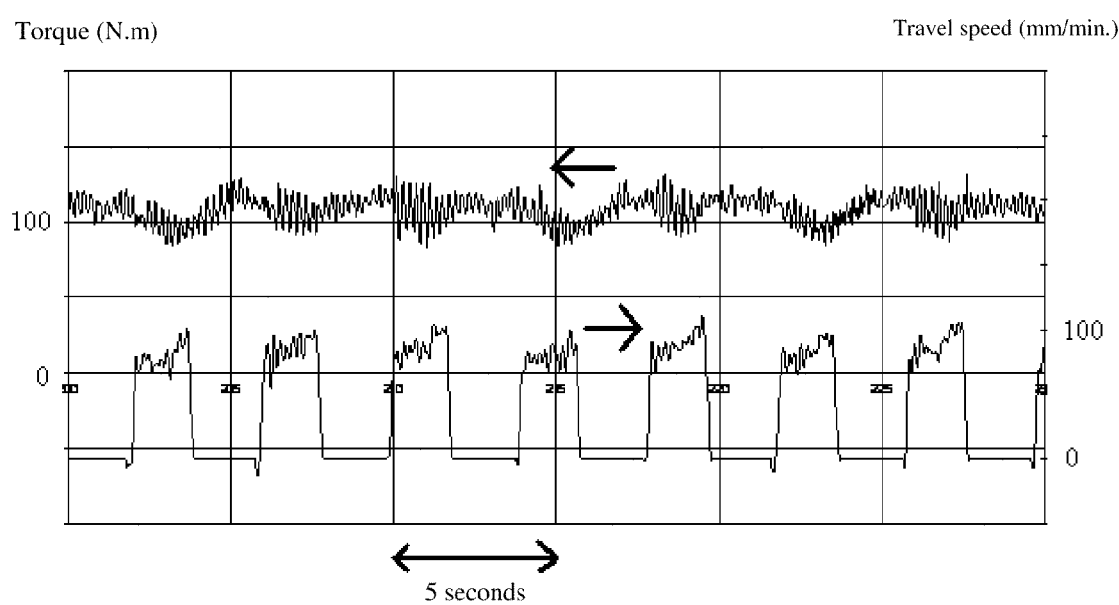
FIG. 7 is an extract of the torque measurement and travel speed recording for test No. 46.
Figure 8:
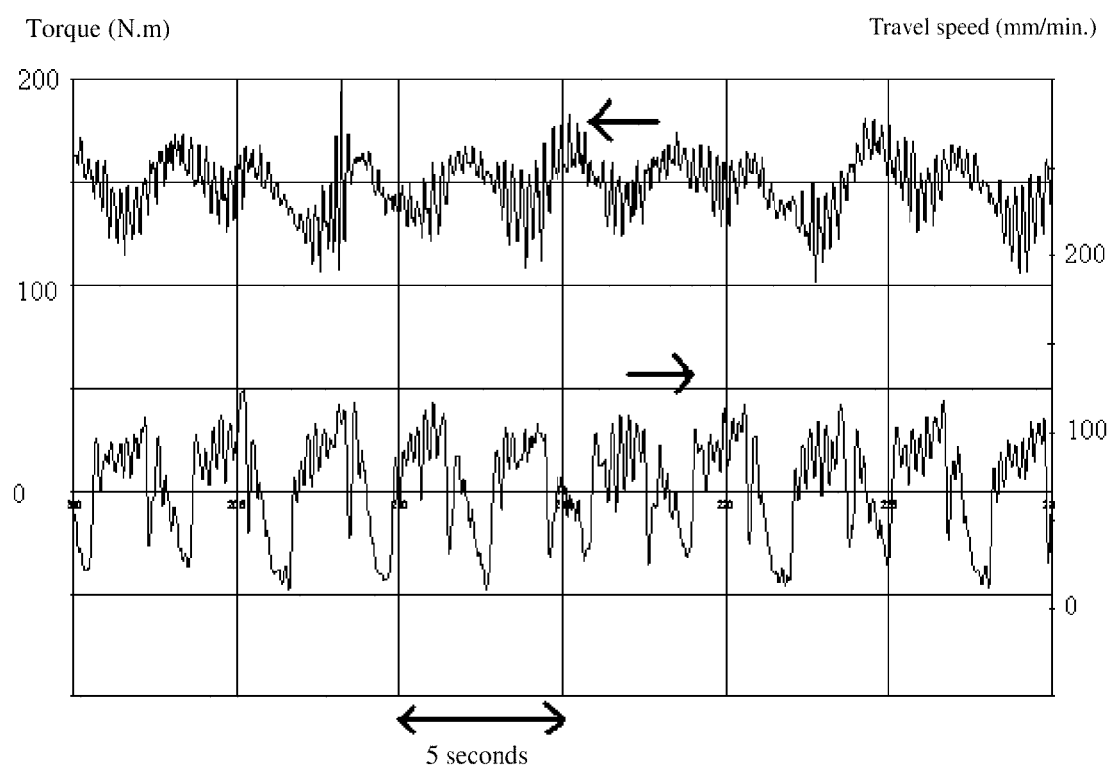
FIG. 8 is an extract of the torque measurement and travel speed recording for test No. 48.

The sheets were secured to the welding table using 3 clamps on each side. The 2050-T3 alloy sheet was placed on the advancing side and the 7449-T6 alloy sheet was placed on the retreating side. The parameters used for the various tests and the results obtained are given in Table 3. FIGS. 6, 7, and 8 show an extract of the torque measurement and travel speed recording for test Nos. 41, 46 and 48, respectively.

TABLE 3

Friction stir welding tests at pulsed travel speed

| Test No. | T (sec) | V1 (mm/min) | V1 (sec) | V2 (mm/min) | V2 (sec) | Tool rotation speed (rpm) | Surface condition | Joint compactness |
|---|---|---|---|---|---|---|---|---|
| 41 | 3.8 | 100 | 1.8 | 0 | 2 | 250 | Good | Good |
| 46 | 3.8 | 100 | 1.8 | 0 | 2 | 300 | Correct | Correct |
| 48 | 3.8 | 110 | 1.65 | 25 | 1.5 | 250 | Correct | Good |

Figure 5:
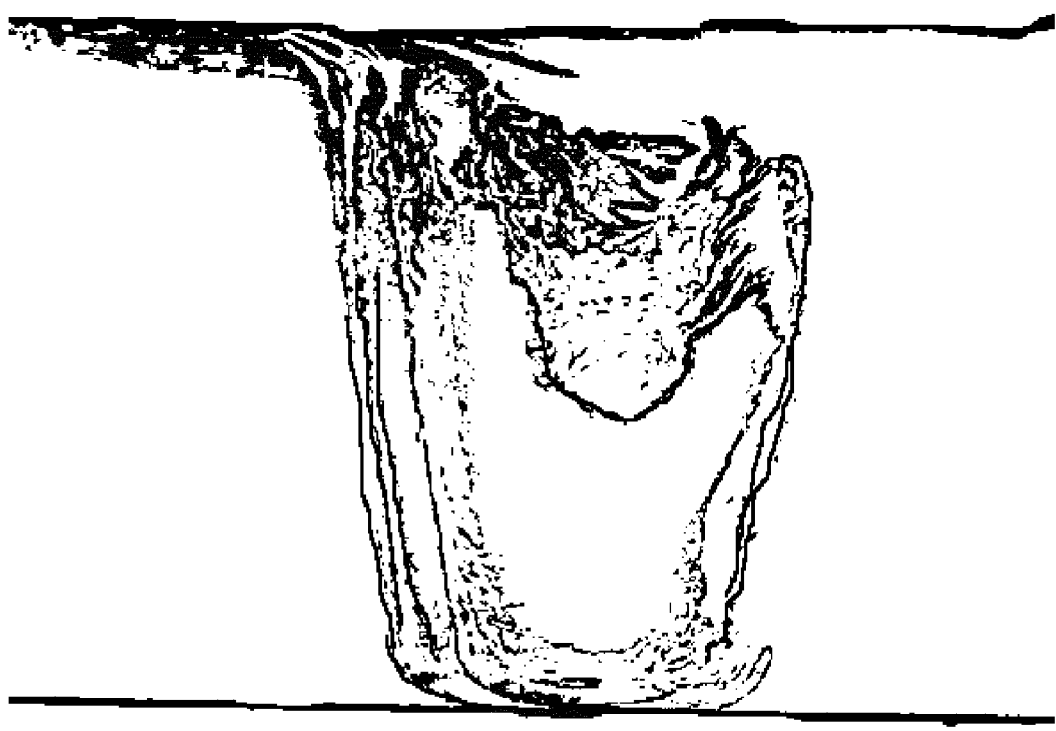
FIG. 5 is a cross-section of the weld performed in test No. 41.

The best results were obtained in test 41; FIG. 5 is a cross-section of the weld obtained for test 41. It is characterized by the absence of flash and by satisfactory compactness. For test 46, a few flashes are observed and compact defects are observed; nevertheless, these characteristics are deemed correct. For test 48, the surface condition is correct (a few flashes present) and joint compactness is good. FIG. 6 shows that the torque measured for test 41 is stable and can be reproduced for each cycle, which indicates that the weld can be easily performed over great length. FIGS. 7 and 8 show that the torque values measured for tests 46 and 48 are less stable than in the case of test 41, which indicates that difficulties may be encountered in a weld of great length.

The static mechanical characteristics of tests 2 and 41 were measured (extensometer length L0=80 mm) after post-weld tempering of 18 h at 155° C. and are indicated in Table 4. The mechanical characteristics of non-welded specimens made of 2050 and 7449 alloy in the same metallurgical state are also presented in Table 4. Elongation is much greater for the assembly performed according to the invention. A significant increase in tensile strength is also observed.

TABLE 4

Static mechanical characteristics measured for tests 2 and 41.

| Test No. | Rp0.2 (MPa) | Rm (MPa) | A (%) | Rm(welded)/ Rm 7449 |
|---|---|---|---|---|
| 2050 T8 | 520 | 549 | 11.58 | |
| 7449 T79 | 602 | 634 | 12.02 | |
| 2 | 254 | 267 | 0.4 | 42% |
| 41 | 244 | 312 | 2.7 | 49% |

Example 4

In this example, friction stir welding was used to weld AA2050-T8 alloy sheets and AA7449-T6 alloy sheets together in the conditions defined for test 41. Two tempering conditions were used to reach a temper state of T8, the conditions are indicated in Table 5.

TABLE 5

Welding tests conducted with different pre- and post-weld tempering.

| Test No. | Sheet - advancing side | Sheet - retreating side | Post-weld tempering |
|---|---|---|---|
| 57 | 2050 - T3 | 7449 - T6 | 18 h at 155° C. |
| 51 | 2050 - T8 (Tempered 8 h at 155° C.) | 7449 - T6 | 10 h at 155° C. |
| 54 | 2050 - T8 (Tempered 18 h at 155° C.) | 7449 - T6 | 10 h at 155° C. |

For tests 51, 54 and 57, the welds obtained exhibited good surface condition and satisfactory compaction.

The mechanical characteristics obtained (extensometer length L0=80 mm) are presented in Table 6.

TABLE 6

Static mechanical characteristics measured for tests 51, 54 and 57.

| Test No. | Rp0.2 (MPa) | Rm (MPa) | A (%) | Rm(welded)/ Rm 7449 |
|---|---|---|---|---|
| 2050 T8 | 520 | 549 | 11.58 | |
| 7449 T79 | 602 | 634 | 12.02 | |
| 57 | 248 | 336 | 2.55 | 53% |
| 51 | 243 | 345 | 2.88 | 54% |
| 54 | 244 | 343 | 2.99 | 54% |

Example 5

In this example the optimal weld speed, optimal rotation speed and the welding energy were determined or estimated by comparison with other alloys for 13.5 mm or 16 mm thick plates made of AA2022-T851 alloy, AA7040-T6 alloy and AA7449-T6 alloy, for a weld thickness of 13.5 or 16 mm, The optimal conditions correspond to the highest welding speed that can be reached while obtaining satisfactory weld quality in terms of both cross-section (particularly without porosities, see FIG. 4) and on the surface (particularly without flashes, see FIG. 3).

The results obtained are given in Table 7.

TABLE 7

| | | | optimal friction stir welding conditions | | | |
|---|---|---|---|---|---|---|
| Alloy | Sheet thk (mm) | Thk welded (mm) | Torque (N·m) | Rotation speed (rpm) | Travel speed (mm/min) | Welding energy (J/m) |
| 2022-T851 | 16 | 16 | 185* | 200* | 100* | $2.32 \cdot 10^{6}$* |
| 7040-T6 | 16 | 16 | 170* | 230 | 100 | $2.46 \cdot 10^{6}$* |
| 7449-T6 | 13.5 | 13.5 | 123 | 270 | 90 | $2.32 \cdot 10^{6}$ |

*estimated value

What is claimed is:

1. A friction stir welding process for forming a weld between at least a first part made of metal alloy A with at least a second part made of a dissimilar metal alloy B, comprising the steps of:
    placing said first and second parts side by side to form a joint therebetween, and
    welding the first and second parts along the joint by moving a rotating tool along the joint at a predetermined travel speed,
    wherein the predetermined travel speed alternates in continuous service in repeated cycles of predetermined duration between a first predetermined maximum average travel speed V1 and a second predetermined minimum average travel speed V2, where $0 \leq V2 \leq 0.8 \times V1$.

2. The process according to claim 1, wherein V2 is at least 30 mm/min less than V1.

3. The process according to claim 1, wherein the a cycles have a duration T<15 seconds.

4. The process according to claim 3, wherein the cycles have a duration between 0.1 and 10 seconds.

5. The process according to claim 3, wherein in each of said cycles, speed V1 is maintained for a duration T1 and speed V2 is maintained for a duration T2, T1 and T2 each being at least equal to 20% of the duration T.

6. The process according to claim 5, wherein:

$$1 < (T1\,V1 - T2\,V2)^2 < 400.$$

7. The process according to claim 1, wherein an optimal travel speed is determined for each of said parts and wherein the average welding speed V in continuous service is within a range defined by the optimum travel speed of the part requiring the highest welding energy, plus or minus 20%.

8. The process according to claim 1, wherein the tool rotates at a speed which is substantially constant in continuous service.

9. The process according to claim 8, wherein an optimal tool rotation speed is determined for each part taken separately and wherein the tool rotation speed is in a range defined by the optimal tool rotation speed of the part requiring the highest welding energy, plus or minus 20%.

10. The process according to claim 1, wherein one of said parts is designated as being on an advancing side of the weld and the other of said parts is designated as being on the retreating side of the weld, the advancing side of the weld being defined as the side on which rotational velocity of the tool has a direction which corresponds to the direction of travel of the tool, and
    wherein the part requiring the highest welding energy is placed on the retreating side.

11. The process according to claim 1, wherein said first part is an aluminum alloy.

12. The process according to claim 11, wherein said second part is made of an aluminum alloy.

13. The process according to claim 12, wherein said first part is made of a 7XXX alloy having a yield strength of greater than 500 MPa in a final metallurgical state.

14. The process according to claim 12, wherein said second part is made of an aluminum-lithium alloy.

15. The process according to claim 1, wherein the weld has a thickness between 1 and 40 mm.

16. The process according to claim 15, wherein the weld has a thickness between 10 and 30 mm.

17. The process according to claim 1, wherein $0 \leq V2 \leq 0.7 \times V1$.

18. A friction stir welding process for forming a weld between at least a first part made of metal alloy A with at least a second part made of a dissimilar metal alloy B, comprising the steps of:
    placing said first and second parts side by side to form a joint therebetween, and
    welding the first and second parts along the joint by moving a rotating tool along the joint at a predetermined travel speed,
    wherein the predetermined travel speed alternates in continuous service between a first predetermined maximum average travel speed V1 and a second predetermined minimum average travel speed V2, where $0 \leq V2 \leq 0.8 \times V1$, and
    wherein the weld has a thickness t expressed in mm, and the speeds V1 and V2, expressed in mm/min, differ by an amount of at least 600/t.

19. The process according to claim 18, wherein the first and second parts are made of aluminum alloys.

* * * * *